United States Patent
Ladda-Zunk et al.

(10) Patent No.: US 7,293,446 B2
(45) Date of Patent: Nov. 13, 2007

(54) COIL BOX, MOUNTED BETWEEN A ROUGHING ROLLING TRAIN AND A FINISHING ROLLING TRAIN

(75) Inventors: Barbara Ladda-Zunk, Hilchenbach (DE); Waldemar Michel, Wenden (DE); Bernhard Ehls, Hilchenbach (DE); Matthias Beuter, Bad Berleburg (DE)

(73) Assignee: SMS Demag AG, Düsseldorf (DE)

( * ) Notice: Subject to any disclaimer, the term of this patent is extended or adjusted under 35 U.S.C. 154(b) by 432 days.

(21) Appl. No.: 10/513,060

(22) PCT Filed: Mar. 25, 2003

(86) PCT No.: PCT/EP03/03080

§ 371 (c)(1),
(2), (4) Date: Oct. 27, 2004

(87) PCT Pub. No.: WO03/101639

PCT Pub. Date: Dec. 11, 2003

(65) Prior Publication Data

US 2005/0150995 A1    Jul. 14, 2005

(30) Foreign Application Priority Data

May 29, 2002   (DE)   ................................ 102 23 905

(51) Int. Cl.
*B21C 47/02*   (2006.01)
*B21C 47/16*   (2006.01)

(52) U.S. Cl. ............................. 72/202; 72/200; 72/146; 72/148; 242/595.1

(58) Field of Classification Search .................. 72/200, 72/202, 250, 146, 148, 169, 183; 242/595.1, 242/550, 909, 535.1, 533.3, 541.2, 542
See application file for complete search history.

(56) References Cited

U.S. PATENT DOCUMENTS

| | | | | |
|---|---|---|---|---|
| 3,805,570 A | * | 4/1974 | Smith | ........................ 72/146 |
| 4,005,830 A | * | 2/1977 | Smith | ...................... 242/533.3 |
| 4,019,359 A | * | 4/1977 | Smith | ........................ 72/231 |
| 4,306,438 A | * | 12/1981 | Child et al. | ................... 72/146 |
| 4,452,587 A | * | 6/1984 | Laws et al. | ................. 432/245 |
| 4,465,912 A | | 8/1984 | Brettbacher et al. | |
| 5,310,131 A | * | 5/1994 | Monaco et al. | ............. 242/550 |

FOREIGN PATENT DOCUMENTS

| | | |
|---|---|---|
| EP | 0904861 | 3/1999 |
| WO | 9109694 | 7/1991 |

* cited by examiner

*Primary Examiner*—Dmitry Suhol
(74) *Attorney, Agent, or Firm*—Friedrich Kueffner

(57) ABSTRACT

The invention relates to a coil box, which is mounted between a roughing rolling train and a finishing rolling train, for metal pre-strips, in particular steel strips, which are hot wound to form coils and are protected against further cooling in the vicinity of a winding and/or unwinding station (6) by means of heat-shield devices (7) on the front faces (5a; 5b) of the coils. The aim of the invention is to universally configure said coil box. To achieve this, the heat-shield devices (7) are configured from lateral walls (8; 8b) that can be pivoted to rest against the front faces (5a; 5b) of the coils and a pair of opposing heat-shield devices (7) can be aligned in parallel to different coil widths (5c).

9 Claims, 3 Drawing Sheets

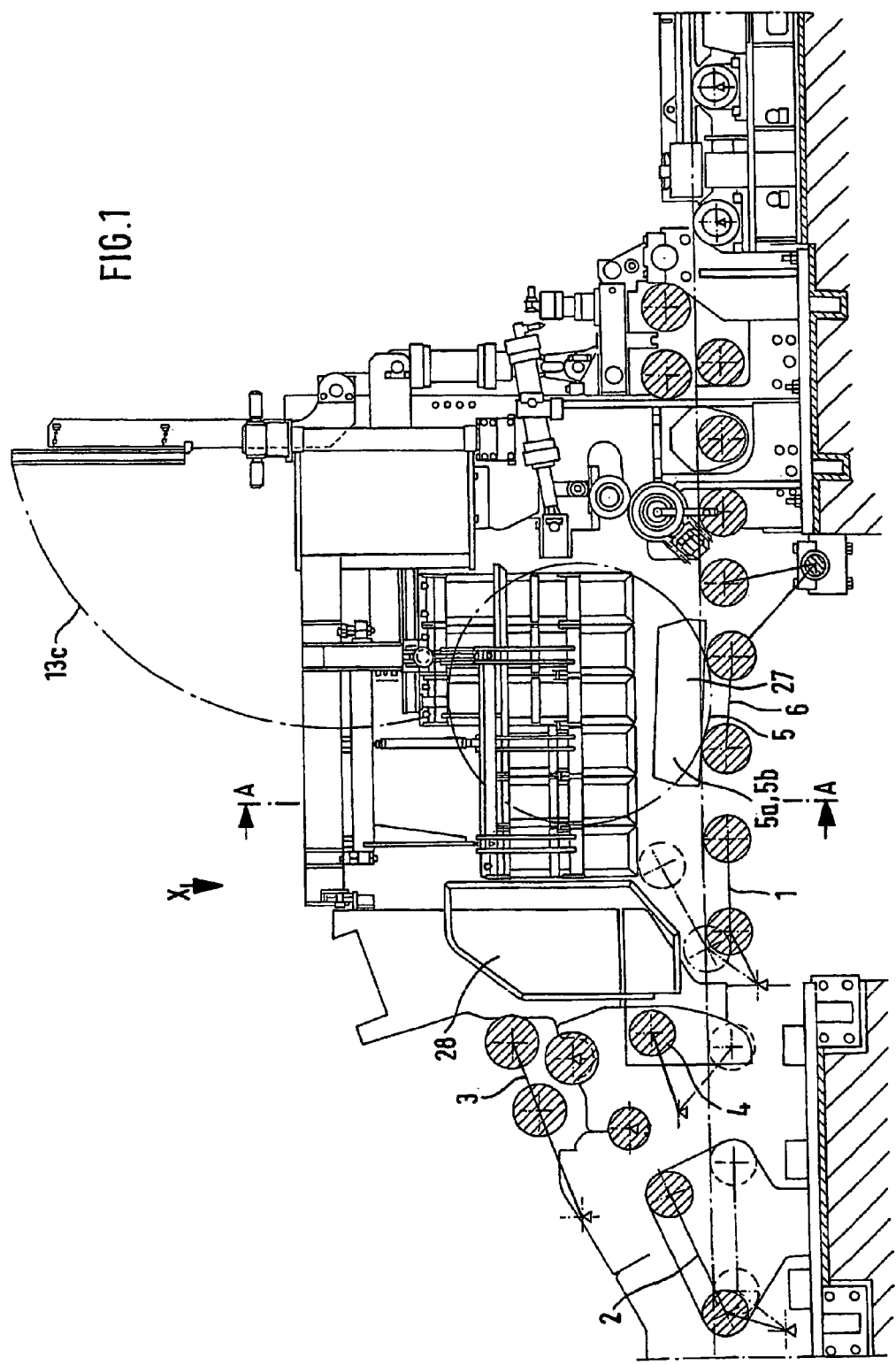

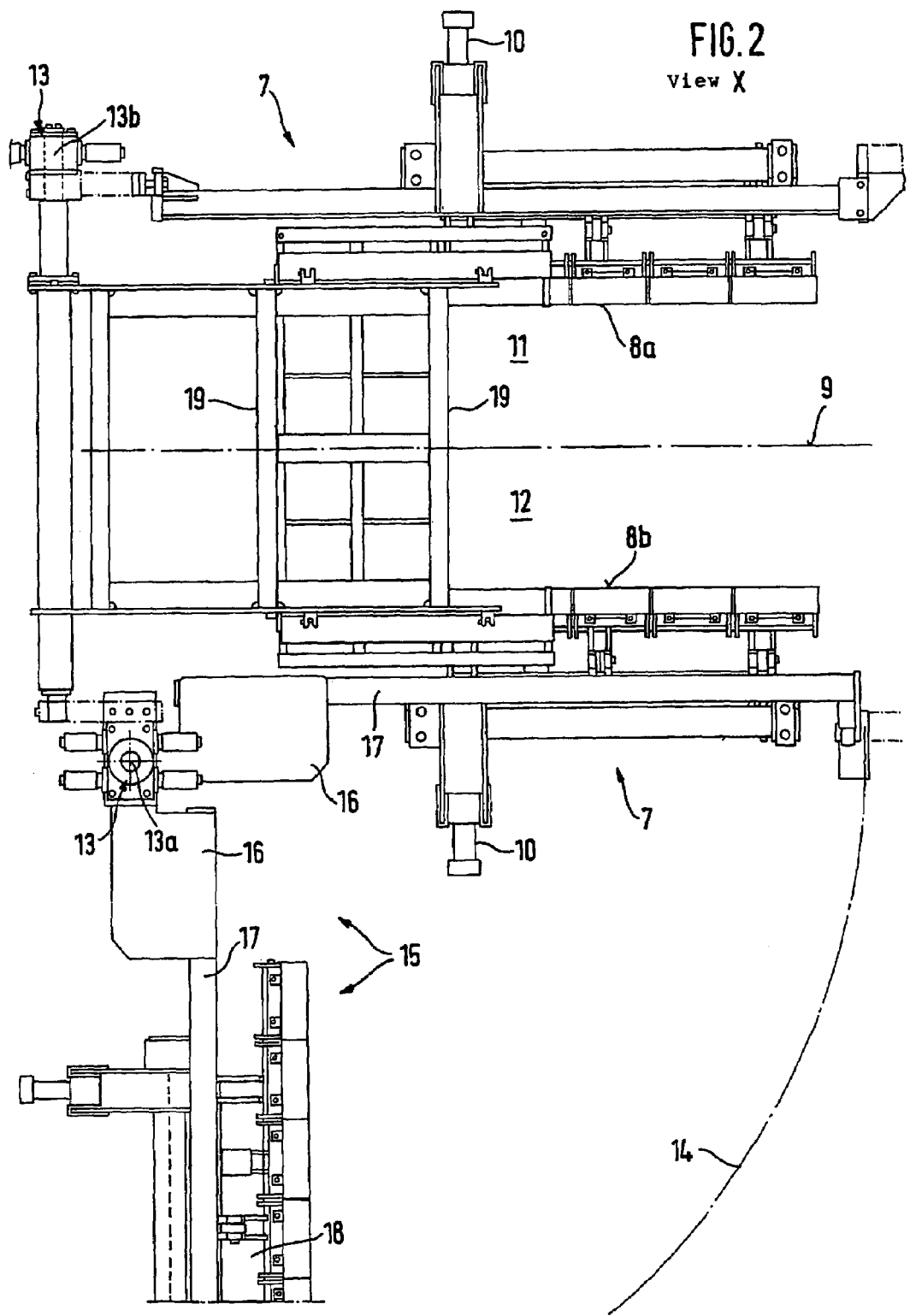

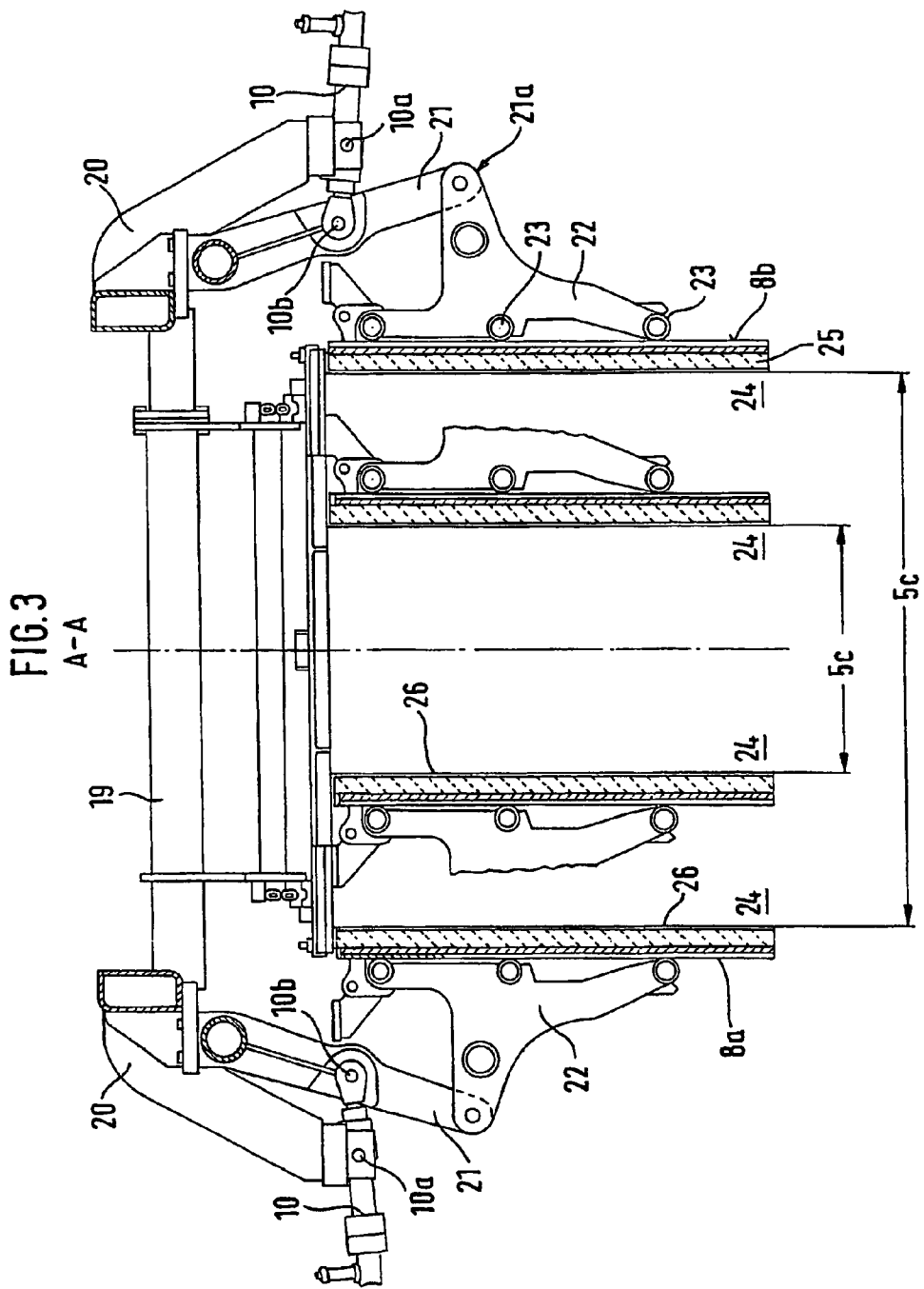

COIL BOX, MOUNTED BETWEEN A ROUGHING ROLLING TRAIN AND A FINISHING ROLLING TRAIN

The invention concerns a coil box installed between a roughing mill and a finishing mill for metal pre-strip, especially steel pre-strip, which is wound hot into coils and is protected from further cooling in the vicinity of a coiling and/or uncoiling station by means of heat shield devices on the end faces of the coils.

A coil box of this type is known from EP 0,507,800 B1. Lateral walls are provided for a mandrelless coiling process to coil the hot metallic material in a first coil position. This is followed by an uncoiling station, from which the steel strip is conveyed to the finishing mill. The heat shield lateral walls are functionally connected with the mandrelless coiling or uncoiling device, which requires the same spacing. The heat shield devices are provided with a reradiating inner surface. Heat shield devices of this type are used in both the winding station and the unwinding station. Sufficient coverage of the end faces of the coil cannot always be achieved in this way.

The objective of the invention is to develop a heat shield device of this type even for varying coil dimensions that are being processed in the given rolling mill.

In accordance with the invention, this objective is achieved by forming the heat shield devices from lateral walls that can be adjusted to the end faces of the coil by swiveling, and a pair of opposing heat shield devices can be adjusted in parallel to different coil widths. The heat shield devices in the vicinity of the uncoiling station of a coil box reduce the temperature difference between the edge of the strip and the center of the strip and also help to keep the temperature distribution in the center of the strip constant over the length of the strip. This produces a better temperature distribution in the pre-strip before the pre-strip enters the finishing mill and thus results in improved quality of the finished product. At the same time, metal strips of completely different widths can be protected.

One embodiment of the invention provides that the heat shield devices can each be adjusted to the corresponding end face of the coil by piston-cylinder units operating in opposite directions. In this way, the space between the edges of the strip and the lateral wall can be kept as small as possible.

These more expensive means by no means need to impair the access to the uncoiling station. The principle of swivelability of the heat shield devices can be utilized to swing the heat shield devices on each side of the coil as a unit out of the vicinity of the uncoiling station by means of a swivel drive.

To take into account the situation in the rolling mill, it is also advantageous for it to be possible, on a rear side of the coil, to swing the heat shield device out or back in a circular path in a vertical plane about a horizontal axis of rotation by means of the swivel drive and, on a front side of the coil, to swing the heat shield device out or back in a horizontal circular path about a vertical axis of rotation by means of the swivel drive.

Another embodiment of the invention provides that the lateral walls are designed like doors that can each be swung out or closed by means of the swivel drive. This has the advantage that, in the event of a disruption, a wound coil can be removed from the coil box by means of a C-hook. In addition, maintenance work is facilitated by the door-like design.

In a modification of the invention, each of the heat shield devices that can be swung out on each side consists of a hydraulic swivel drive, bracket arms, the piston-cylinder unit, a pivoted lever, a bridge frame, and the given lateral wall, and the unit is supported on a transverse frame. Therefore, the unit can also be installed in the uncoiling station later.

In accordance with other features, the parallel adjustment of the lateral walls is designed in such a way that outwardly projecting bracket arms, on each of which the cylinder of each piston-cylinder unit is pivoted, are mounted on the transverse frame that runs transversely to the center of the rolling mill in the uncoiling station; that the corresponding piston rod acts approximately in the center on a pivoted lever pivoted on the frame; and that the bridge frame, which extends approximately over the length of the lateral wall and on which the corresponding lateral wall is mounted at several support points, is pivoted on the end of the pivoted lever.

On the basis of measurements that were performed, it is also advantageous for the lateral wall to be covered on the hot side not only with insulating material but also with a foil-like layer of steel. The steel foil becomes hot significantly faster. Due to the direct contact of the steel foil with the insulating material, the insulating material also heats faster. Since the insulating effect is that much greater the hotter the inner surface temperature of the heat shield is, a heat shield with the foil achieves the full insulation faster than a heat shield without this foil.

However, the positive effect is lost if a foil that is too thick is selected. A steel sheet only 0.5 mm thick no longer has any detectable effect. On the basis of these findings, it is advantageous for the foil-like layer of steel to have a thickness of about 0.05-0.3 mm, and preferably 0.1 mm.

A further improvement of the invention is realized if not only the lateral walls are provided with the insulating material, but also pairs of stabilizers adjacent to the lateral walls in the uncoiling station are provided with the insulating material, and pairs of stabilizers in the coiling station are also provided with the insulating material. At the same time, the foil-like layer of steel can be placed on the insulating material if this makes the insulation more effective. The end faces of the coils can be insulated even better in this way.

Embodiments of the invention are illustrated in the drawings and explained in greater detail below.

FIG. 1 shows a side view of the section of the rolling mill that contains the coil box.

FIG. 2 shows a top view of the installation in direction "X" in accordance with FIG. 1.

FIG. 3 shows a vertical section A-A in accordance with FIG. 1.

In FIG. 1, a coil box is installed between a roughing mill and a finishing mill, with a coiling station 1, in which the coil 5 is coiled by run-in rolls 2, bending rolls 3, and a shaping roll 4. The coil 5 is located in the uncoiling station 6. In the uncoiling station 6, the coil 5 is protected from further cooling at its two coil end faces 5a, 5b, which lie in the plane of the drawing, by means of heat shield devices 7 in the vicinity of the uncoiling station 6.

Furthermore, the heat shield devices 7 are formed by lateral walls 8a, 8b that can be adjusted to the end faces 5a, 5b by swiveling, and a pair of opposing heat shield devices 7 can be adjusted in parallel to different coil widths 5c (a maximum and a minimum coil width). Each of the lateral walls 8a, 8b is guided symmetrically to the center 9 of the rolling mill.

In accordance with FIG. 3, the heat shield devices 7 can each be adjusted to the corresponding end face 5a, 5b of the coil by piston-cylinder units 10 operating in opposite directions.

In FIG. 2, on a front side 11 of the coil, the entire unit 15 can be horizontally swung out or swung back on a horizontal circular path 14 about a vertical axis of rotation 13a by means of a (hydraulic) swivel drive 13, as is shown in the lower part of FIG. 2. The axis of rotation of the swivel drive 13 is perpendicular to the plane of the drawing.

Likewise, on a rear side 11 of the coil, the heat shield device 7 can be swung out or swung back again in a circular path 13c in a vertical plane about a horizontal axis of rotation 13b by means of the swivel drive 13.

The lateral walls 8a, 8b can be designed like doors, approximately as shown in the drawing, and can be swung by means of the swivel drive 13 on the vertical axis of rotation 13a on circular path 14 to open or close them.

In this regard, each entire unit 15 of the swiveling heat shield device 7 consists of a swivel drive 13, a bracket arm 16, the piston-cylinder unit 10, a pivoted lever 17, a bridge frame 18, and the given lateral wall 8a, 8b, and the unit 15 is supported on a transverse frame 19 (cf. FIG. 1).

In accordance with FIG. 3, outwardly projecting brackets 20 are mounted on the transverse frame 19, which runs transversely to the center 9 of the rolling mill. The cylinder 10a of the piston-cylinder unit 10 is pivoted with the bracket 20. The corresponding piston rod 10b is likewise pivoted on a pivoted lever 21, which is connected with the transverse frame 19, and the point of application can be approximately in the center. A bridge frame 22, which extends approximately over the length of the later wall 8a, 8b, is pivoted at the end 21a of the pivoted lever 19, and support points 23 are formed on the bridge frame 22 as connections to the lateral walls 8a, 8b.

The lateral walls 8a, 8b are covered on the hot side 24 with insulating material 25, and the insulating material 25 is covered with a foil-like layer of steel 26. The layer of steel 26 has a thickness of about 0.1 mm and may be only slightly thicker or thinner.

At the same time, the following additional feature is provided (FIG. 1): Not only the lateral walls 8a, 8b are provided with the insulating material, but also pairs of stabilizers 27 adjacent to the lateral walls in the uncoiling station 6 are provided with the insulating material 25, and pairs of stabilizers 28 in the coiling station 1 are also provided with the insulating material 25. It is also advantageous for the insulating material 25 to be covered with the foil-like layer of steel 26.

List of Reference Numbers

| | |
|---|---|
| 1. | coiling station |
| 2. | run-in roll |
| 3. | bending roll |
| 4. | shaping roll |
| 5. | coil |
| 5a | coil end face |
| 5b | coil end face |
| 5c | coil width |
| 6. | uncoiling station |
| 7. | heat shield device |
| 8a | lateral wall |
| 8b | lateral wall |
| 9. | center of the rolling mill |
| 10. | piston-cylinder unit |
| 11. | side of the coil |

-continued
List of Reference Numbers

| | |
|---|---|
| 12. | side of the coil |
| 13. | swivel drive |
| 13a | vertical axis of rotation |
| 13b | horizontal axis of rotation |
| 13c | circular path of the aperture angle |
| 14. | circular path |
| 15. | unit |
| 16. | bracket arm |
| 17. | pivoted lever |
| 18. | bridge frame |
| 19. | transverse frame |
| 20. | bracket |
| 21. | pivoted lever |
| 21a | end of the pivoted lever |
| 22. | bridge frame |
| 23. | support point |
| 24. | hot side |
| 25. | insulating material |
| 26. | layer of steel |
| 27. | stabilizer of the uncoiling station |
| 28. | stabilizer of the coiling station |

The invention claimed is:

1. Coil box installed between a roughing mill and a finishing mill for metal pre-strip, especially steel pre-strip, which is wound hot into coils and is protected from further cooling in the vicinity of a coiling and/or uncoiling station by means of heat shield devices on the end faces of the coil, wherein the heat shield devices (7) are formed by lateral walls (8a; 8b) that can be adjusted to the end faces (5a; 5b) of the coil by swiveling, and a pair of opposing heat shield devices (7) can be adjusted in parallel to different coil widths (5c), wherein the heat shield devices (7) on each side of the coil (11; 12) can be swung as a unit (15) out of the vicinity of the uncoiling station (6) by means of a swivel drive (13).

2. Coil box in accordance with claim 1, wherein the heat shield devices (7) can each be adjusted to the corresponding end face (5a; 5b) of the coil by piston-cylinder units (10) operating in opposite directions.

3. Coil box in accordance with claim 1, wherein, on a rear side (11) of the coil, the heat shield device (7) can be swung out or back in a circular path (13c) in a vertical plane about a horizontal axis of rotation (13b) by means of the swivel drive (13) and, on a front side (12) of the coil, the heat shield device (7) can be swung out or back in a horizontal circular path (14) about a vertical axis of rotation (13a) by means of the swivel drive (13).

4. Coil box in accordance with claim 1, wherein the lateral walls (8a; 8b) are designed like doors that can each be swung out or closed by means of the swivel drive (13).

5. Coil box in accordance with claim 1, wherein each of the heat shield devices (7) that can be swung out on each side (11; 12) consists of a hydraulic swivel drive (13), bracket arms (16), a piston-cylinder unit (10), a pivoted lever (17), a bridge frame (18), and the given lateral wall (8a; 8b), and the unit (15) is supported on a transverse frame (19).

6. Coil box in accordance with claim 5, wherein outwardly projecting brackets (20), on each of which the cylinder (10a) of each piston-cylinder unit (10) is pivoted, are mounted on a transverse frame (19) that runs transversely to the center (9) of the rolling mill in the uncoiling station (6); that the corresponding piston rod (10b) acts approximately in the center on a pivoted lever (21) pivoted on the transverse frame (19); and that a bridge frame (22), which extends approximately over the length of the lateral wall (8a; 8b) and on which the corresponding lateral wall (8*a*; 8*b*) is mounted at several support points (23), is pivoted on the end (21*a*) of the pivoted lever (21).

7. Coil box in accordance with claim 1, wherein the hot side (24) of the lateral wall (8*a*; 8*b*) is covered not only with insulating material (25) but also with a layer of steel foil (26).

8. Coil box in accordance with claim 7, wherein the foil-like layer of steel (26) has a thickness of about 0.05-0.3 mm.

9. Coil box in accordance with claim 7, wherein not only the lateral walls (8*a*; 8*b*) are provided with the insulating material (25), but also pairs of stabilizers (27) adjacent to the lateral walls in the uncoiling station (6) are provided with the insulating material (25), and pairs of stabilizers (28) in the coiling station (1) are also provided with the insulating material (25).

* * * * *